(12) United States Patent
Ito et al.

(10) Patent No.: US 11,010,033 B2
(45) Date of Patent: May 18, 2021

(54) DISPLAY CONTROL APPARATUS AND METHODS FOR GENERATING AND DISPLAYING A RELATED-ITEM PLATE WHICH INCLUDES SETTING ITEMS WHOSE FUNCTIONS ARE RELATED TO A DESIGNATED SETTING ITEM

(71) Applicant: Olympus Corporation, Tokyo (JP)

(72) Inventors: Kensei Ito, Sagamihara (JP); Naoki Fujii, Tokyo (JP)

(73) Assignee: Olympus Corporation, Tokyo (JP)

( * ) Notice: Subject to any disclaimer, the term of this patent is extended or adjusted under 35 U.S.C. 154(b) by 438 days.

(21) Appl. No.: 15/018,083

(22) Filed: Feb. 8, 2016

(65) Prior Publication Data
US 2016/0246493 A1    Aug. 25, 2016

(30) Foreign Application Priority Data

Feb. 19, 2015    (JP) .............................. JP2015-030499

(51) Int. Cl.
*G06F 3/0484*    (2013.01)
*G06F 3/0488*    (2013.01)

(52) U.S. Cl.
CPC ........ *G06F 3/04847* (2013.01); *G06F 3/0488* (2013.01)

(58) Field of Classification Search
CPC .................................................. G06F 3/04847
USPC ......................................................... 715/771
See application file for complete search history.

(56) References Cited

U.S. PATENT DOCUMENTS

| 5,805,167 | A  | * | 9/1998 | van Cruyningen ... | G06F 3/0482 715/808 |
| 9,778,829 | B2 | * | 10/2017 | VanBlon .............. | G06F 3/04842 |
| 2003/0063126 | A1 | * | 4/2003 | Yanchar ................ | G06F 3/0481 715/781 |
| 2004/0021647 | A1 | * | 2/2004 | Iwema .................. | G06F 3/0488 345/179 |
| 2004/0261038 | A1 | * | 12/2004 | Ording .................. | G06F 3/0481 715/792 |

(Continued)

FOREIGN PATENT DOCUMENTS

| CN | 104205032 A | 12/2014 |
| JP | 2005-227896 | 8/2005 |

(Continued)

OTHER PUBLICATIONS

First Office Action from corresponding Chinese Patent Application Serial No. 201610082006.7 dated Apr. 28, 2018, with translation (18 pgs.).

(Continued)

*Primary Examiner* — Sherief Badawi
*Assistant Examiner* — Conrad R Pack
(74) *Attorney, Agent, or Firm* — John C. Pokotylo; Pokotylo Patent Services

(57) ABSTRACT

A display control apparatus includes a display control unit that controls a display of a condition setting screen for setting a condition for a device on a screen, wherein the display control unit displays a list screen in which setting items for conditions for a device are grouped and displays, according to an instruction, an item plate overlapping the list screen, in which one or more setting items in the list screen are displayed.

17 Claims, 17 Drawing Sheets

(56) References Cited

U.S. PATENT DOCUMENTS

| | | | | |
|---|---|---|---|---|
| 2005/0046725 | A1* | 3/2005 | Sasagawa | H04N 5/2628 348/333.01 |
| 2005/0177800 | A1* | 8/2005 | Suzuki | G06F 3/04842 715/823 |
| 2005/0216862 | A1* | 9/2005 | Shinohara | H04N 5/23293 715/825 |
| 2006/0123357 | A1* | 6/2006 | Okamura | G06F 3/0482 715/786 |
| 2007/0030293 | A1* | 2/2007 | Shimizu | G06F 3/0481 345/668 |
| 2007/0126877 | A1* | 6/2007 | Yang | H04N 5/225 348/207.99 |
| 2007/0198950 | A1* | 8/2007 | Dodge | G06F 3/0481 715/815 |
| 2008/0282194 | A1* | 11/2008 | Chiang | G06F 3/0482 715/835 |
| 2008/0307355 | A1* | 12/2008 | Yokota | G06F 3/0488 715/808 |
| 2010/0085384 | A1* | 4/2010 | Kim | G06F 3/0488 345/660 |
| 2010/0169835 | A1* | 7/2010 | Tabata | G06F 3/0482 715/823 |
| 2010/0173705 | A1* | 7/2010 | Manning | G07F 17/3211 463/30 |
| 2011/0074829 | A1* | 3/2011 | Lee | G06F 3/04883 345/661 |
| 2011/0128224 | A1* | 6/2011 | Ludwig | G06F 3/0346 345/161 |
| 2011/0157234 | A1* | 6/2011 | Lainer | G06F 3/0488 345/660 |
| 2011/0267372 | A1* | 11/2011 | Baar | G06T 3/0018 345/660 |
| 2012/0249585 | A1* | 10/2012 | Ohkawa | G06F 3/04883 345/629 |
| 2012/0287065 | A1 | 11/2012 | Oshinome | |
| 2013/0241828 | A1* | 9/2013 | VanBlon | G06F 3/0416 345/157 |
| 2014/0118563 | A1* | 5/2014 | Mehta | G06F 3/04845 348/207.1 |
| 2014/0123036 | A1* | 5/2014 | Bao | G06F 3/0488 715/760 |
| 2015/0002436 | A1 | 1/2015 | Yano et al. | |
| 2015/0301709 | A1* | 10/2015 | Chambers | G06F 3/04883 715/716 |

FOREIGN PATENT DOCUMENTS

| | | |
|---|---|---|
| JP | 2009-251658 | 10/2009 |
| JP | 2010-171961 | 8/2010 |
| JP | 2011-159166 | 8/2011 |
| JP | 2012-238177 | 12/2012 |
| JP | 2013-054756 | 3/2013 |
| JP | 2013-191113 A | 9/2013 |
| JP | 2014-096821 | 5/2014 |

OTHER PUBLICATIONS

Notification of Reasons for Refusal from corresponding Japanese Patent Application Serial No. 2015-030499, dated Jun. 26, 2018, with translation (6 pgs.).

Second Office Action to corresponding Chinese Patent Application Serial No. 201610082006.7, dated Mar. 11, 2019 (7 pgs.), with translation (9 pgs.).

Notification of Reasons for Refusal to corresponding Japanese Patent Application Serial No. 2015-030499, dated Feb. 5, 2019 (3 pgs.), with translation (3 pgs.).

* cited by examiner

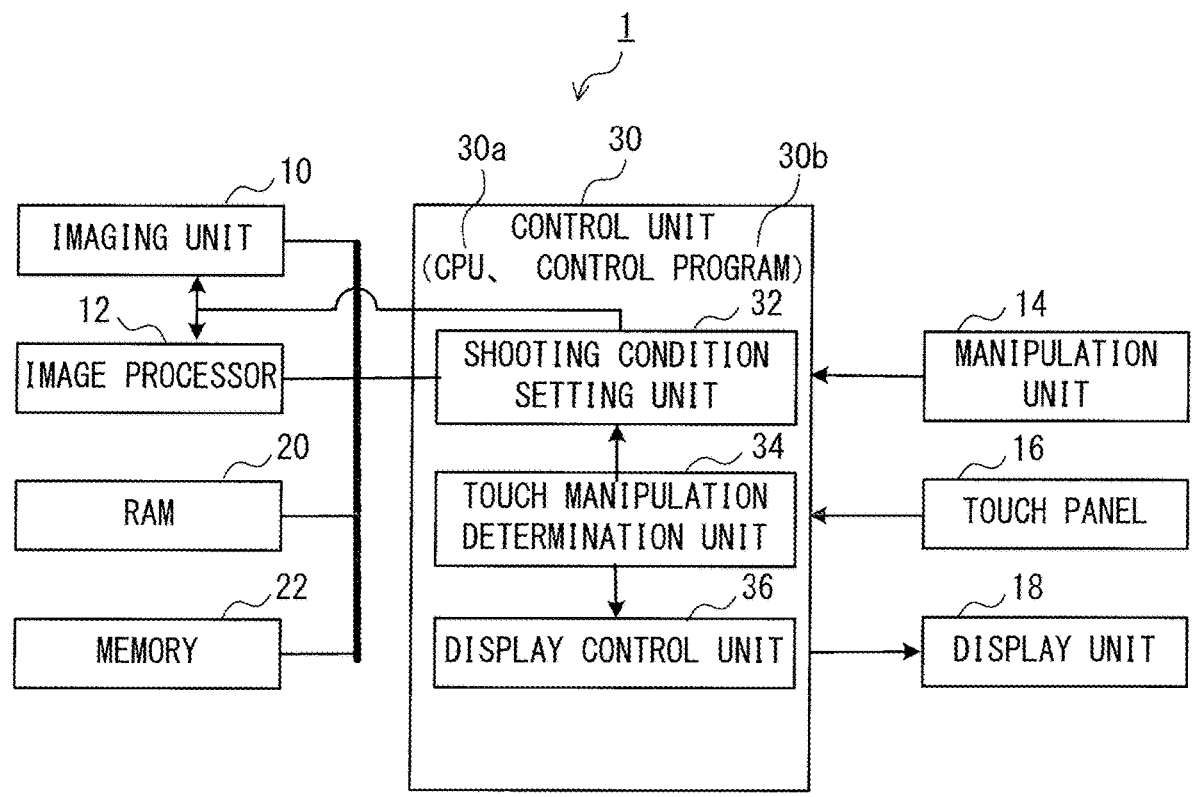
F I G. 1

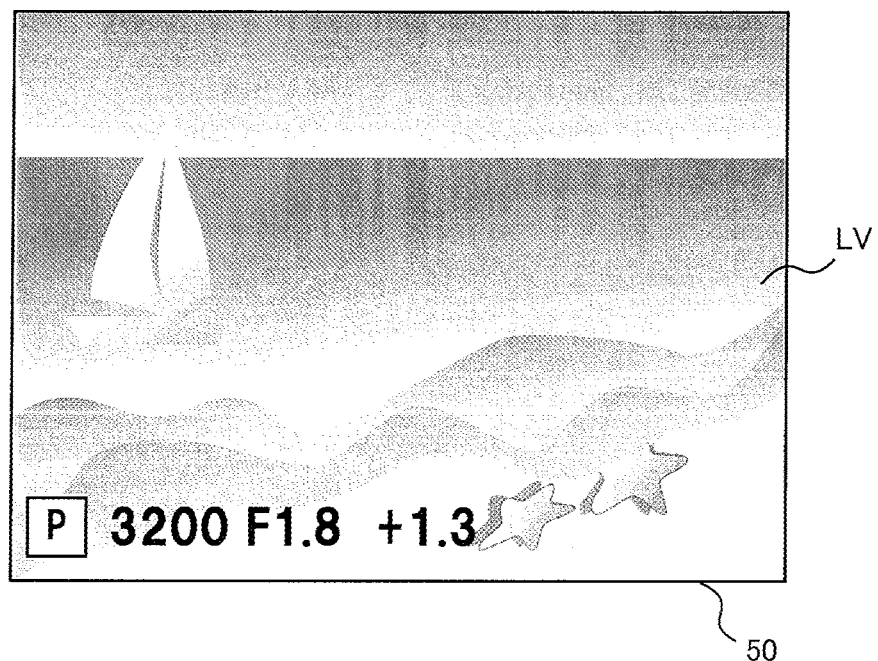
F I G. 3

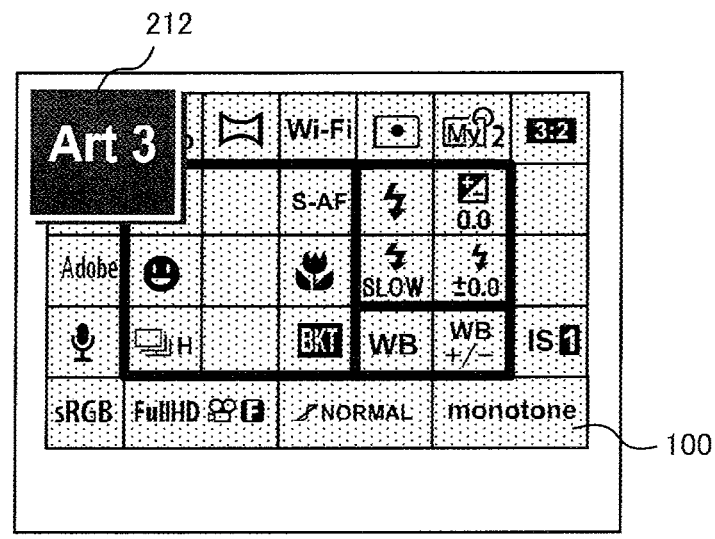
F I G. 6 A
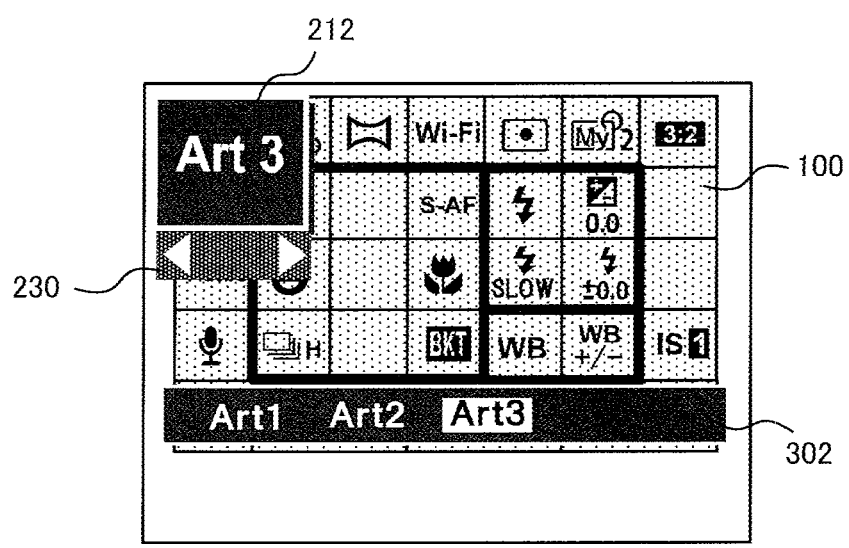
F I G. 6 B

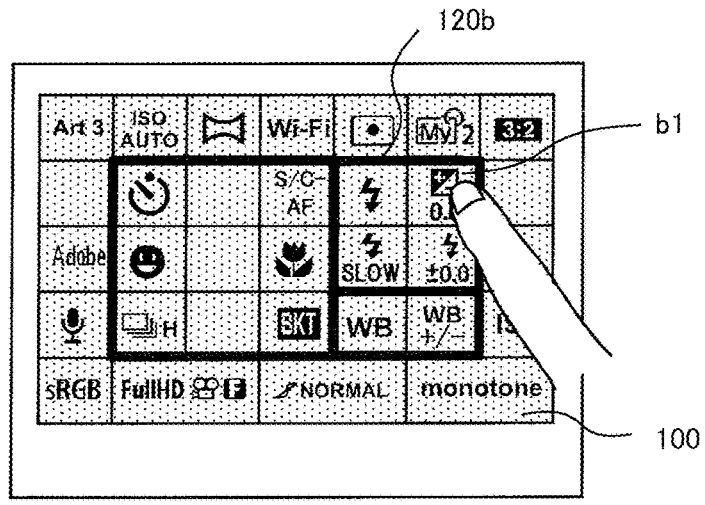
F I G. 9 A
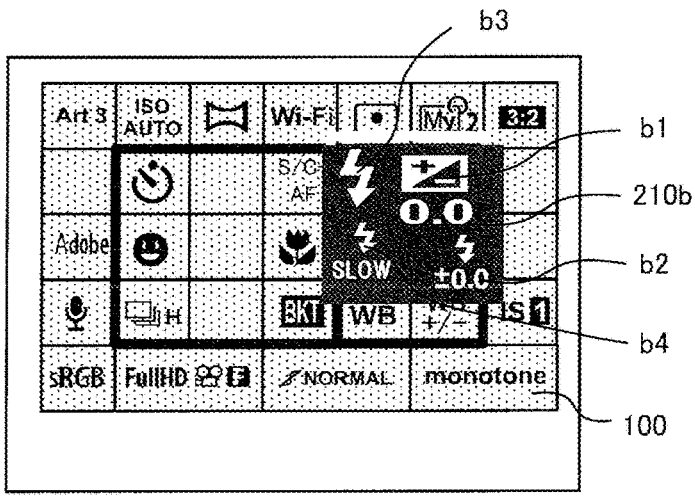
F I G. 9 B
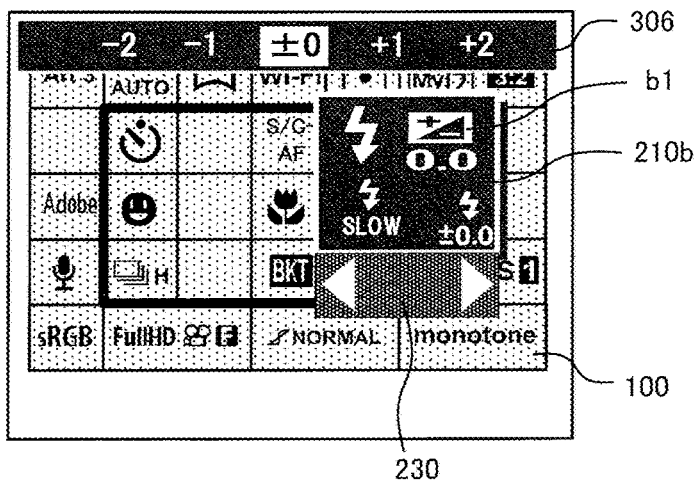
F I G. 9 C

DISPLAY CONTROL APPARATUS AND METHODS FOR GENERATING AND DISPLAYING A RELATED-ITEM PLATE WHICH INCLUDES SETTING ITEMS WHOSE FUNCTIONS ARE RELATED TO A DESIGNATED SETTING ITEM

CROSS-REFERENCE TO RELATED APPLICATION

This application is based upon and claims the benefit of priority of the prior Japanese Patent Application No. 2015-30499, filed on Feb. 19, 2015, the entire contents of which are incorporated herein by reference.

BACKGROUND OF THE INVENTION

Field of the Invention

The present invention relates to a technology of a user interface for changing a set value for a device condition.

Description of the Related Art

A touch panel is mounted in many portable information devices such as a multifunctional phone or a digital camera, and a necessary condition setting is made by a touch manipulation performed on various setting screens displayed on the touch panel. In such a small-sized touch panel, conditions for setting a device are often configured hierarchically because there are plenty of functions mounted in an information device. As an example, Japanese Laid-open Patent Publication No. 2011-159166 has been proposed.

SUMMARY OF THE INVENTION

An object of the present invention is to provide a display control apparatus that displays, upon setting a device condition, a condition setting screen whose manipulation performance has been improved.

In order to attain the above-mentioned object, a display control apparatus of the present invention includes a display control unit that controls a display of a condition setting screen for setting a condition for a device on a screen, wherein the display control unit displays a list screen in which setting items for conditions for a device are grouped and displays, according to an instruction, an item plate overlapping the list screen, in which one or more setting items in the list screen are displayed.

BRIEF DESCRIPTION OF THE DRAWINGS

FIG. 1 is a block diagram of a digital camera according to embodiments of the present invention;

FIG. 3 illustrates a screen on which a live view image is displayed;

FIG. 6A illustrates a screen when starting displaying of a single-item plate;

FIG. 6B illustrates the screen with the single-item plate to which a manipulation guide and an option row are added;

FIG. 9A illustrates a screen 1 for explaining a brightness-adjustment-related related-item plate;

FIG. 9B illustrates a screen 2 for explaining the brightness-adjustment-related related-item plate;

FIG. 9C illustrates a screen 3 for explaining the brightness-adjustment-related related-item plate;

DETAILED DESCRIPTION OF THE PREFERRED EMBODIMENTS

Figure 2:
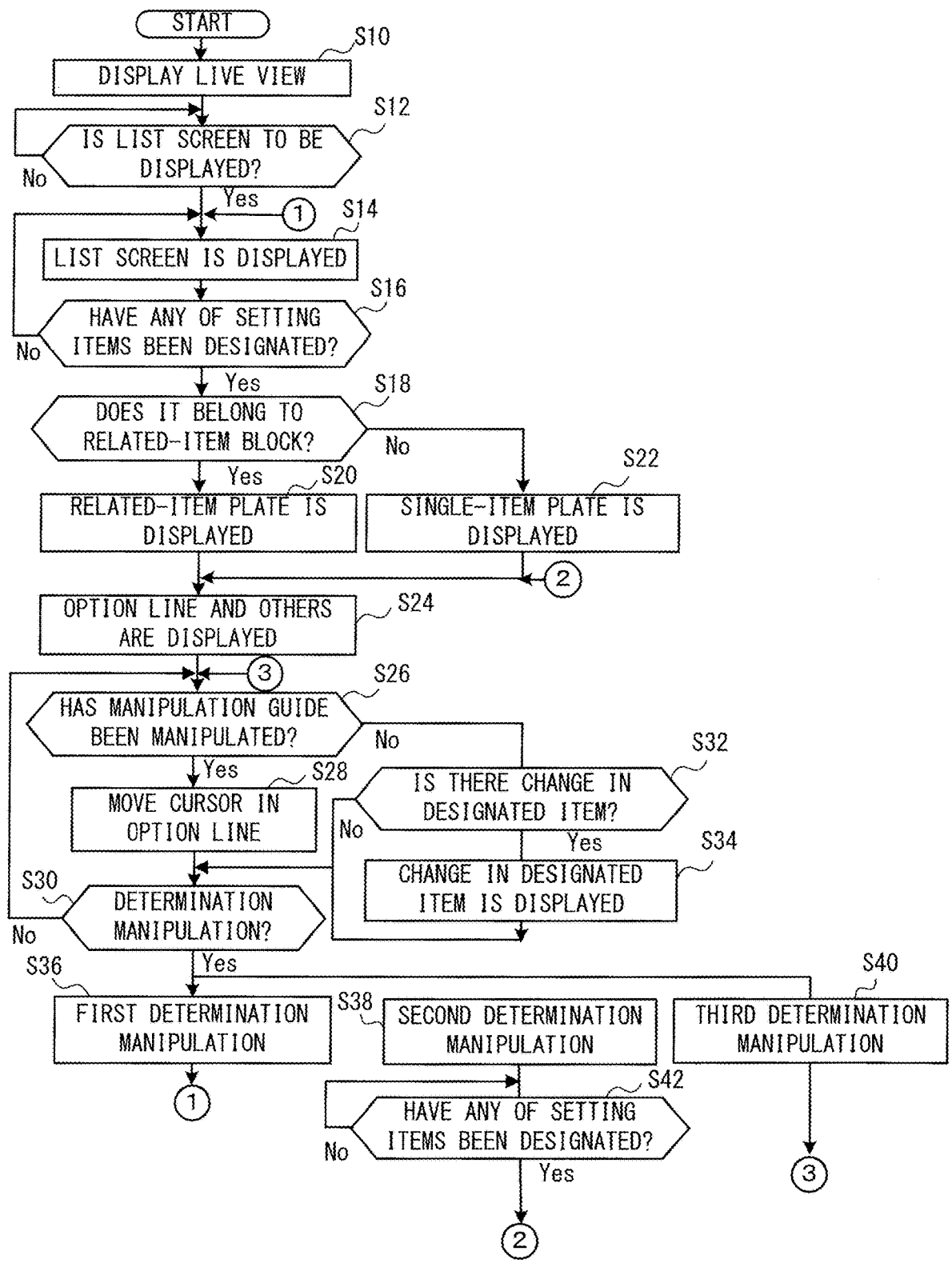
FIG. 2 is a flowchart that illustrates a procedure of display control processing for a shooting condition setting screen according to a first embodiment.

Embodiments with respect to a display control apparatus of the present invention will now be described with reference to the drawings. The display control apparatus controls a display of a condition setting screen for setting a condition for a device on a screen. An example of a display control apparatus mounted in a digital camera (imaging device) that is one of the portable information devices will be described below.

For a digital camera, in addition to a shooting condition, there are, for example, a playback condition, a communication condition, and a printing condition as conditions for a device that is set by the display control apparatus, and a screen for setting a shooting condition is now described as an example of a condition setting screen.

FIG. 1 is a block diagram of the digital camera 1 in which the display control apparatus of the present invention is mounted. The digital camera 1 includes, for example, an imaging unit 10, an image processor 12, a manipulation unit 14, a touch panel 16, a display unit 18, a RAM 20, a memory 22, and a control unit 30.

The imaging unit 10 includes a camera that has, for example, a lens that forms an object image and an imaging element that optoelectrically converts a signal of a formed image and outputs it as an image signal, and an imaging circuit that adjusts a gain of an image signal, performs analog-to-digital conversion, and outputs it as image data.

The image processor 12 performs, on image data, various processes such as a gain adjustment, a color interpolation process, a WB (white balance) process, a γ (gamma) process, a gradation process, a compression and extension process (for example, a JPEG process), and a special effects shooting process.

The manipulation unit 14 includes, for example, a power button that instructs ON/OFF control of power, a mode button that switches between various camera modes including a shooting mode and a playback mode, a release button that instructs execution of shooting, an I button that instructs switching of a live view, an XY-direction button, an OK button, and a dial (none of which are shown).

The touch panel 16 is manipulation means for detecting a position of a user's touch on a screen and is integral with the display unit 18. The display unit 18 is constituted of, for example, an LCD, and is arranged, for example, on the back of the digital camera 1. On the display unit 18, for example, a shot image, a shooting menu, or a shooting condition setting screen is displayed.

The RAM 20 is a temporary storage memory that stores therein the image data output from the imaging unit 10 and provides a working area for the various processes performed by the image processor 12. The memory 22 is a non-volatile storage memory for maintaining the image data compressed by the image processor 12 or a control program.

The control unit 30 is a control unit that performs an overall control of the entire digital camera 1. The control unit 30 is a function executed by a CPU 30a that has read a control program 30b. The CPU 30a reads the control program 30b stored in the memory 22 and performs control processing.

As a display-control-processing-related function executed by the CPU 30a that has read the control program 30b, the control unit 30 includes a shooting condition setting unit 32, a touch manipulation determination unit 34, and a display control unit 36. The display control apparatus is constituted of the control unit 30.

The shooting condition setting unit 32 sets, in a shooting mode, various shooting conditions for the imaging unit 10 and the image processor 12, on the basis of an instruction of a user that is detected by the manipulation unit 14 or the touch manipulation determination unit 34. An item that corresponds to each shooting condition is referred to as a "shooting condition setting item" (hereinafter abbreviated to "setting item").

Specifically, the shooting condition setting unit 32 sets, for the imaging unit 10, specific conditions that correspond to the respective setting items with respect to, for example, a flash, a continuous shooting, and an AF mode. Further, the shooting condition setting unit 32 sets, for the image processor 12, specific conditions that correspond to the respective setting items with respect to, for example, an ISO speed, a white balance, an aspect ratio, a continuous shooting mode, and a special effects shooting process.

The touch manipulation determination unit 34 receives a signal output from the touch panel 16 and detects an aspect of a touch of a user's finger (for example, a position, a time, or a direction), so as to determine a content of a touch manipulation.

The display control unit 36 creates a display image to be displayed on the display unit 18, using the RAM 20 as a video memory, so as to perform, on the display unit 18, a display control on the created display image. In a playback mode, the display control unit 36 displays a shot image recorded in the memory 22.

Further, the display control unit 36 displays a condition setting screen for setting a shooting condition. The display control unit 36 displays a list screen or an item plate as a condition setting screen. The list screen is a screen on which setting items are arranged horizontally and vertically in a list, and the item plate is a screen on which one or more specific setting items are displayed.

In a shooting mode, the display control unit 36 displays a list screen overlapping a live view as a condition setting screen. Then, the display control unit 36 displays an item plate overlapping the list screen, the item plate being based on a setting item designated on the list screen. Further, in order to select a specific condition in the item plate, the display control unit 36 displays, along with the item plate, an option row in which options are arranged. Furthermore, in order to select a condition in the option row, the display control unit 36 displays a selection guide including switching buttons along with the item plate. The details will be described below.

First Embodiment

A first embodiment provides an example of displaying, as an item plate, a related-item plate in which setting items whose respective functions are related to one another are arranged. FIG. 2 is a flowchart that illustrates a procedure of display control processing for a shooting condition setting screen according to the first embodiment. FIGS. 3 to 14 illustrate examples of screens displayed on the display unit 18 according to the first embodiment. The display control processing will be described according to the order in the flowchart of FIG. 2, with appropriate reference to the examples of screens. The display control processing illustrated in FIG. 2 is performed mainly by the shooting condition setting unit 32, the touch manipulation determination unit 34, and the display control unit 36.

It is assumed that the digital camera 1 is powered on and is set in a shooting mode. The display control unit 36 displays a live view image LV output from the image processor 12 on the display unit 18 (Step S10).

FIG. 3 illustrates a screen 50 on which the live view image LV is displayed. For example, a shooting mode (program), an ISO speed (3200), an aperture (F1.8), and an exposure correction value (+1.3) are displayed on the lower left of the screen 50 as a current shooting condition.

The display control unit 36 determines whether an instruction to display a list screen issued by a photographer has been received from the manipulation unit 14 (Step S12). When the display control unit 36 determines that the instruction to display a list screen issued by depressing a list screen instruction button included in the manipulation unit 14 has not been received (No in Step S12), the process returns to Step S10. Further, when a shooting instruction issued by use of a release button included in the manipulation unit 14 has been received, the control unit 30 performs shooting and records a shot image in the memory 22.

Figure 4:
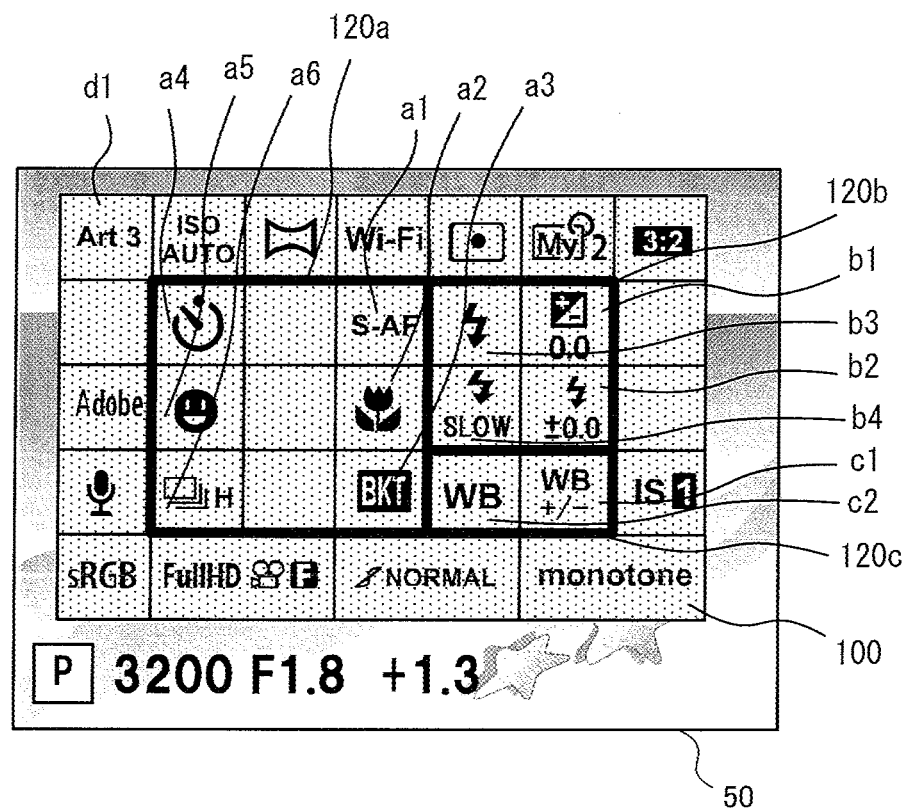
FIG. 4 illustrates an example of displaying a list screen.

When it determines that an instruction to display a list screen has been received from the manipulation unit 14 (Yes in Step S12), the display control unit 36 displays a list screen 100 overlapping the live view image LV. FIG. 4 illustrates an example of displaying the list screen 100. The list screen 100 is displayed at a size that occupies a major portion of the screen 50.

The display control unit 36 arranges a plurality of setting items on the list screen 100. This is an example of arranging setting items, with five in the vertical direction and seven in the horizontal direction. A setting item is represented by an icon or a sign and is designated such that a type of setting item and a current setting condition can be distinguished. The display control unit 36 displays the list screen 100 such that the underlying live view image LV slightly shows through.

On the list screen 100 according to the first embodiment, setting items whose respective functions are related to one another are displayed in an area divided for each of the setting items. On the list screen 100, an area bounded by a bolded boarder 120*a* is a drive-related related-item block. The drive-related related-item block includes setting items a1 to a6. A drive-related related item is an item that is mainly related to a shooting operation.

The setting items that belong to the drive-related related-item block will be briefly described. The setting item al is an item that sets the type of AF such as a manual AF, a single AF, or a continuous AF. The setting item a2 is an item that sets a closest distance. The setting item a3 is an item that sets a condition for a bracket shooting (AE, AF, and WB). The setting item a4 is an item that sets a time of a self-timer. The setting item a5 is an item that selects a right or left pupil that is to be targeted for a face-prioritizing AF. The setting item a6 is an item that sets a continuous/single shooting or a continuous shooting speed in a continuous shooting.

An area bounded by a bolded boarder 120*b* is a brightness-adjustment-related related-item block. The brightness-adjustment-related related-item block includes setting items b1 to b4. The setting items b1 to b4 are setting items whose respective functions are related to one another with respect to brightness adjustment.

The setting item b1 is an item that sets an exposure correction value. The setting item b2 is an item that adjusts a flash light emission amount. The setting item b3 is an item that sets forced light emission. The setting item b4 is an item that sets a slow synchronization.

An area bounded by a bolded boarder 120*c* is a white-balance-adjustment-related related-item block. The white-balance-adjustment-related related-item block includes setting items c1 and c2. The setting items c1 and c2 are setting items whose functions are related to each other with respect to white balance adjustment.

The setting item c1 is an item that sets a white balance compensation value. The setting item c2 is an item that sets a white balance mode.

Setting items outside the bolded boarder 120*a*, the bolded boarder 120*b*, and the bolded boarder 120*c* are items that are less relevant to one another. For example, a setting item d1 at the top-left corner is an item that sets a condition for a special shooting.

Return to FIG. 2. The touch manipulation determination unit 34 determines whether any of the setting items have been designated on the list screen 100 of FIG. 4 (Step S16). The touch manipulation determination unit 34 determines, by use of the touch panel 16, whether a touch manipulation has been performed in a position of any of the setting items.

When the touch manipulation determination unit 34 determines that none of the setting items have been designated (No in Step S16), the process returns to Step S14. When the touch manipulation determination unit 34 determines that any of the setting items have been designated (Yes in Step S16), the display control unit 36 determines whether the designated item is an item that belongs to a related-item block (Step S18). When it determines that the designated item is an item that belongs to a related-item block (Yes in Step S18), the display control unit 36 displays, as an item plate 200, a corresponding related-item plate overlapping the list screen 100 (Step S20).

Figure 5A:
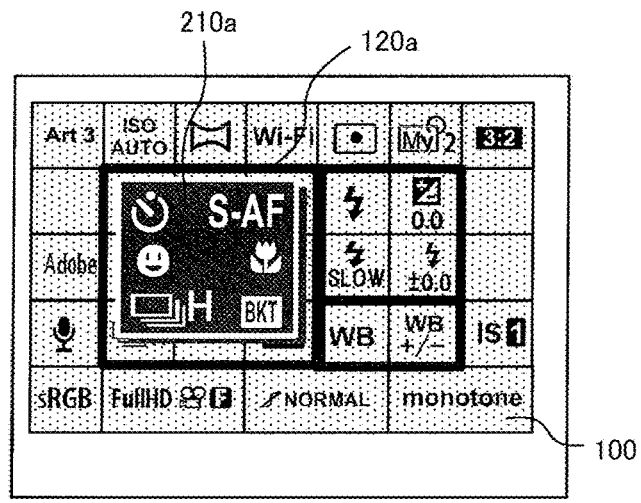
FIG. 5A illustrates a screen when starting displaying of a related-item plate.

FIG. 5A illustrates a screen when starting displaying of a related-item plate 210. It is assumed that, on the screen of FIG. 4, any of the setting items a1 to a6 that belong to the drive-related related-item block are designated and, in this case, the setting item a1 (AF) is designated. In and after FIG. 5C, an illustration of the live view image LV will be omitted.

The display control unit 36 displays, as a related-item plate 210, a drive-related related-item plate 210*a* overlapping the area bounded by the bolded boarder 120*a* on the list screen 100.

Figure 5B:
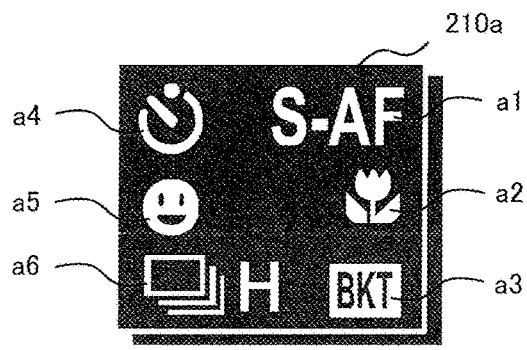
FIG. 5B is an enlarged view of the related-item plate.

FIG. 5B is an enlarged view of the related-item plate 210*a*. In the related-item plate 210*a*, the setting items a1 to a6 are displayed having a positional relationship similar to that of the list screen 100. In order for a designated setting item to be clearly visible, the setting item a1 that is a designated item in this case may be displayed in a size larger than the others.

Figure 5C:
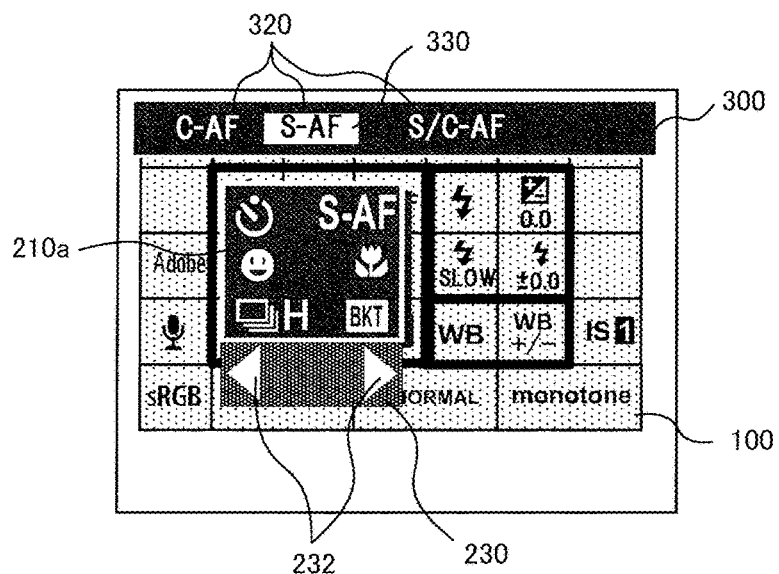
FIG. 5C illustrates the screen with the related-item plate to which a manipulation guide and an option row are added.

After it displays the screen of FIG. 5A for a short time period (about one second), the display control unit 36 displays a screen illustrated in FIG. 5C to which a manipulation guide 230 and an option row 300 are added (Step S24). The manipulation guide 230 is a manipulation unit that switches the condition in the designated setting item. The manipulation guide 230 is equipped with a set of buttons 232 for moving a cursor from side to side. The manipulation guide 230 is provided in a position adjacent to or near the related-item plate 210*a*.

In the option row 300, conditions corresponding to the respective designated setting items are arranged as an option 320. A cursor 330 is displayed for identifying a current condition in the options 320. A position of the cursor 330 moves by use of the buttons 232 in the manipulation guide 230. Further, the option row 300 is displayed in a position away from the related-item plate 210*a*, but it may be displayed at the bottom of the screen, not at its top.

When it determines that the designated item is not an item that belongs to a related-item block (No in Step S18), the display control unit 36 displays, as the item plate 200, a single-item plate 212 overlapping the list screen 100 (Step S22).

FIGS. 6A and 6B illustrate screens on which the single-item plate 212 is displayed. When the setting item d1 (Art 3) at the top-left corner on the list screen 100 of FIG. 4 is designated, the single-item plate 212 is displayed.

For the single-item plate 212, the display control unit 36 displays a screen to which the manipulation guide 230 and an option row 302 are added (see FIG. 6B) after it displays the screen on which there is only the single-item plate 212 (see FIG. 6A) for a short time period, as is the case with the related-item plate 210. This has been described in Step S24. The display control unit 36 displays the single-item plate 212 in a position of a corresponding setting item on the list screen 100. In this case, the single-item plate 212 is displayed at the top-left corner on the screen.

The touch manipulation determination unit 34 determines whether the buttons 232 in the manipulation guide 230 have been touch-manipulated (Step S26). When the touch manipulation determination unit 34 determines that the buttons 232 in the manipulation guide 230 have been touch-manipulated (Yes in Step S26), the display control unit 36 moves the cursor 330 in the option row 300 according to the type of touch-manipulated button or according to the number of touch manipulations performed on the buttons (Step S28).

Figure 7:
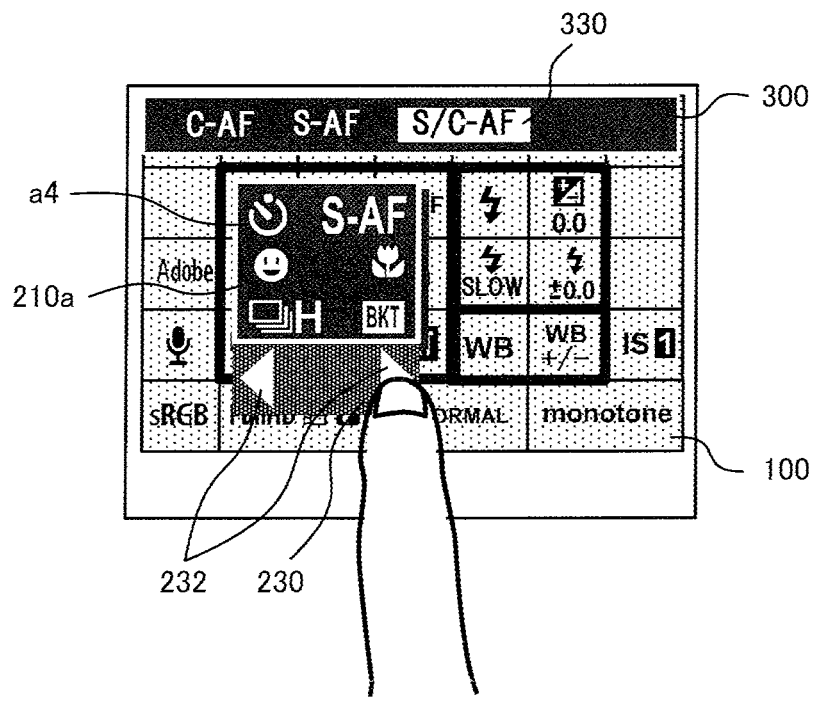
FIG. 7 illustrates a screen in which options have been changed by use of the related-item plate.

FIG. 7 illustrates a screen in which options have been changed. FIG. 7 illustrates an example in which the condition for AF is switched from S-AF (single AF) to C-AF (single/continuous AF) as a result of manipulating the buttons 232 in the manipulation guide 230. The cursor 330 moves to S/C-AF.

The touch manipulation determination unit 34 determines whether a determination manipulation has been performed (Step S30). The determination manipulation is a manipulation that determines the condition changed by use of the manipulation guide 230 and is performed by a photographer.

When an item plate is the related-item plate 210a, there are three determination manipulations as follows. A first determination manipulation is a "touch manipulation performed outside the item plate". "Outside the item plate" is "outside the related-item plate 210a in FIG. 5C". In other words, when a touch manipulation is performed outside the related-item plate 210a, the touch manipulation determination unit 34 determines that the first determination manipulation has been performed.

Next, a second determination manipulation is a "touch manipulation performed on a currently designated setting item". In FIG. 5C, the setting item a1 is a designated setting item, so when a touch manipulation is performed on the setting item a1, the touch manipulation determination unit 34 determines that the second determination manipulation has been performed.

Then, a third determination manipulation is a "touch manipulation performed on another setting item in the item plate". In FIG. 5C, the setting item a1 is a designated setting item, so when a setting item other than the setting item a1, for example, the setting item a4, is depressed in the related-item plate 210a, the touch manipulation determination unit 34 determines that the third determination manipulation has been performed.

When an item plate is the single-item plate 212, there is only the first determination manipulation as a determination manipulation. Mainly, the related-item plate 210a will be described in Step S36 to Step S42.

When the shooting condition setting unit 32 determines that a determination manipulation has not been performed (No in Step S30), the process returns to Step S26. When the touch manipulation determination unit 34 determines that any of the determination manipulations have been performed (Yes in Step S30), the shooting condition setting unit 32 changes the condition for a setting item according to the option, and the display control unit 36 changes the display after changing the condition according to the determination manipulation.

When the determination manipulation is the first determination manipulation, as processing of the first determination manipulation (Step S36), the shooting condition setting unit 32 changes the condition for a setting item, the display control unit 36 displays a list screen on which the related-item plate 210a is not displayed in an overlapping manner and in which the condition has been changed, and the process returns to Step S14.

Figure 8A:
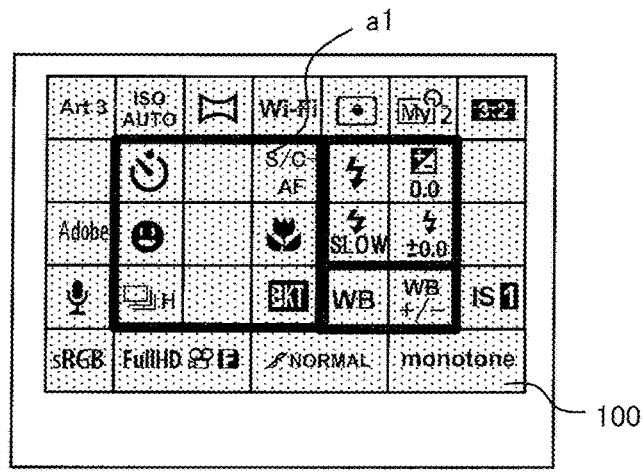
FIG. 8A illustrates the list screen after a first determination manipulation.

FIG. 8A illustrates the list screen 100 after the first determination manipulation. With respect to the setting item a1, the condition that has been switched from a previous condition (S-AF) to a changed condition (S/C-AF) is displayed. Also when the item plate is the single-item plate 212, similar processing is performed.

When the determination manipulation is the second determination manipulation, as processing of the second determination manipulation (Step S38), the shooting condition setting unit 32 changes the condition for a setting item. Then, in the second determination manipulation, as illustrated in FIG. 8B, the display control unit 36 displays the related-item plate 210a in which the condition for a setting item has been changed and deletes the manipulation guide 230 and the option row 300.

Figure 8B:
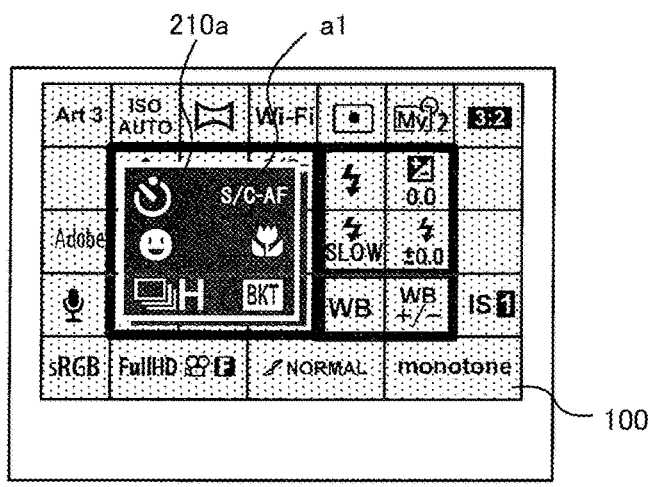
FIG. 8B illustrates the screen after a second determination manipulation in the related-item plate.
Figure 8C:
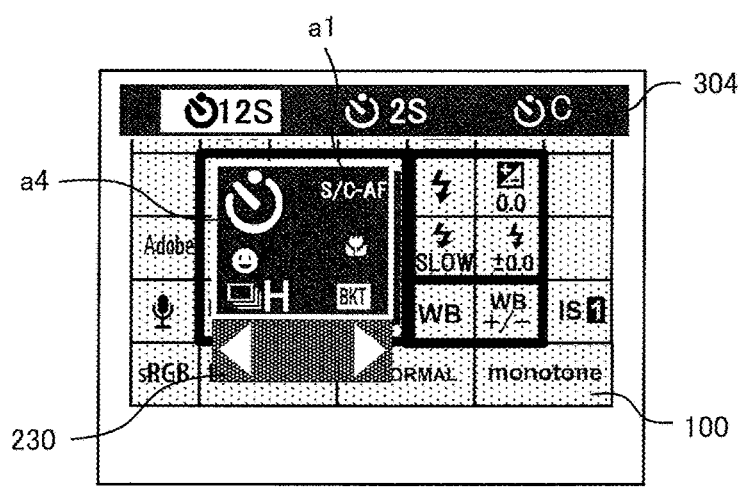
FIG. 8C illustrates the screen after a third determination manipulation in the related-item plate.

On the screen of FIG. 8B, the touch manipulation determination unit 34 determines whether any of the setting items have been designated (touch-manipulated) in the related-item plate 210a (Step S42). The touch manipulation determination unit 34 loops the process until any of the setting items are designated (No in Step S42). When the touch manipulation determination unit 34 determines that any of the setting items have been designated (Yes in Step S42), the process returns to Step S24, and an option row for a newly designated setting item is displayed.

When the determination manipulation is the third determination manipulation, as processing of the third determination manipulation (Step S40), the shooting condition setting unit 32 changes the condition for a setting item. It is assumed that, in FIG. 5C, the setting item a4 (self-timer) in the related-item plate 210 is touch-manipulated. Then, the display control unit 36 displays the screen illustrated in FIG. 8C. In the related-item plate 210a, the setting item a1 whose condition has been changed is displayed, the setting item a4 that is a newly designated setting item is displayed in a larger size, and an option row 304 whose content corresponds to the setting item a4 is displayed.

The process returns to Step S26, and when the touch manipulation determination unit 34 determines that the buttons 232 in the manipulation guide 230 have not been touch-manipulated (No in Step S26), the display control unit 36 determines whether there is a change in the setting item designated in Step S16 (Step S32). The process of Step S32 is only performed when the related-item plate 210 is displayed, and for the single-item plate 212, the process moves on to Step S30 when it is No in Step S26. The reason is that there is only one setting item for the single-item plate 212.

If the related-item plate 210 is displayed as the item plate 200 illustrated in FIG. 5C, the display control unit 36 determines that a setting item whose condition is desired to be changed (the setting item a1 in FIG. 5C) has been changed when the touch manipulation determination unit 34 determines that another setting item (an item other than the setting item a1, that is, any of the setting items a2 to a6) in the related-item plate 210 has been touch-manipulated. The setting item designated as a target whose condition is to be changed will also hereinafter be referred to as "designated item".

When the display control unit 36 determines that the designated item has not been changed (No in Step S32), the process returns to Step S30. When it determines that the designated item has been changed (Yes in Step S32), the display control unit 36 displays the change in the designated item (Step S34). The description of the flowchart in FIG. 2 will be terminated here.

The example of the drive-related related-item plate 210a illustrated in FIGS. 5A to 5C has been described above as the related-item plate 210, and next, an example of displaying another related-item plate will be described. FIGS. 9A to 9C illustrate examples of displaying a related-item plate 210b in the brightness-adjustment-related related-item block.

FIG. 9A illustrates the setting item b1, an item related to brightness adjustment, being designated (touch-manipulated) on the list screen 100. When the setting item b1 is designated, the related-item plate 210b is displayed overlapping the area bounded by the bolded boarder 120b (see FIG. 9B). The setting items b1 to b4 that belong to a related-item block are displayed in a group in the related-item plate 210b, and the setting item b1 is displayed in a larger size.

After the screen of FIG. 9B is displayed for a short time period, an option row 306 that corresponds to the setting item b1 and the manipulation guide 230 are displayed along with the related-item plate 210b (see FIG. 9C). The option row 306 is displayed in a position away from the related-item plate 210b, and the manipulation guide 230 is provided in a position adjacent to the related-item plate 210b.

Figure 10A:
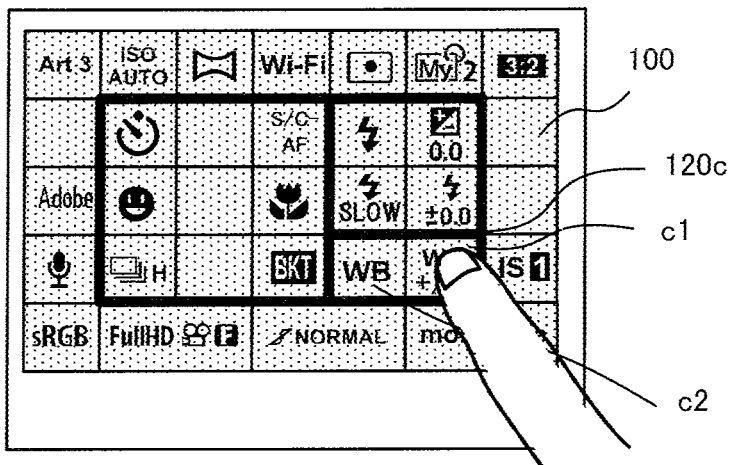
FIG. 10A illustrates a screen 1 for explaining a white-balance-adjustment-related related-item plate.

FIG. 10A illustrates the setting item c1, an item related to white balance adjustment, being designated on the list screen 100. When the setting item c1 is designated, a related-item plate 210c that is larger than the area bounded by the bolded boarder 120c is displayed covering the area bounded by the bolded boarder 120c (see FIG. 10B). The setting items c1 and c2 that belong to a related-item block are displayed in a group in the related-item plate 210c, and the setting item c1 is displayed in a larger size. The sizes of the related-item plate 210b and the related-item plate 210c may be displayed in a size equal to that of the related-item plate 210a.

Figure 10B:
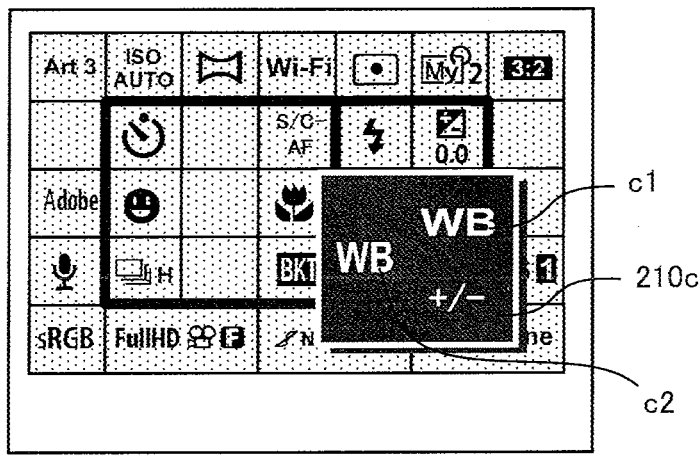
FIG. 10B illustrates a screen 2 for explaining the white-balance-adjustment-related related-item plate.
Figure 10C:
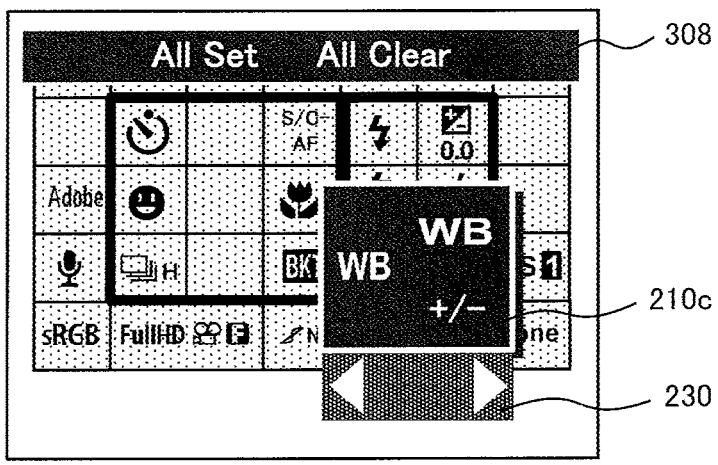
FIG. 10C illustrates a screen 3 for explaining the white-balance-adjustment-related related-item plate.

After the screen of FIG. 10B is displayed for a short time period, an option row 308 that corresponds to the setting item c1 and the manipulation guide 230 are displayed along with the related-item plate 210c (see FIG. 10C). The option row 308 is displayed in a position away from the related-item plate 210c, and the manipulation guide 230 is provided in a position adjacent to the related-item plate 210c.

Figure 11:
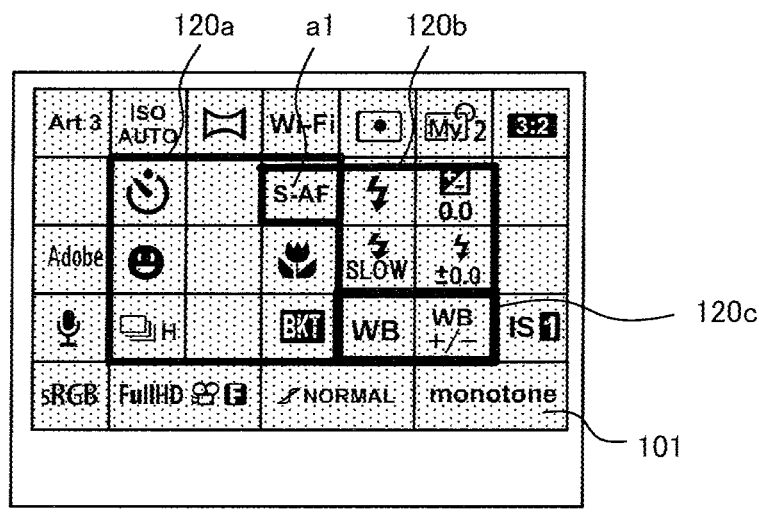
FIG. 11 illustrates the list screen when related-item blocks overlap.

FIG. 11 illustrates a list screen when related-item blocks overlap. FIG. 4 illustrates a case in which the related-item blocks do not overlap. FIG. 11 illustrates an example of a list screen 101 in which some setting items are included in a plurality of related-item blocks. In this case, when the setting item a1 belongs to both the related-item block of the bolded boarder 120a and the related-item block of the bolded boarder 120b, the bolded boarder 120a and the bolded boarder 120b are displayed in a state in which they overlap partly so as to clarify that the setting item a1 is included in both areas.

Further, the display appearance of a related-item plate is not limited to those illustrated in, for example, FIGS. 5A to 5C. Two examples of other display appearances of a related-item plate will be described.

Figure 12A:
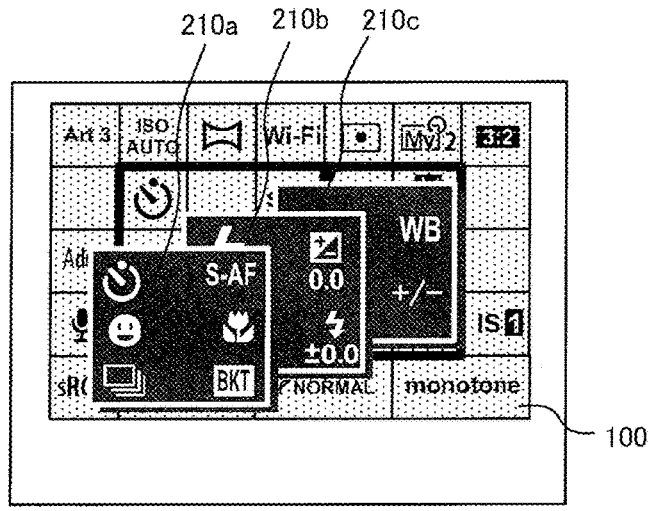
FIG. 12A illustrates a screen 1 having an other display appearance 1 of a related-item plate.
Figure 12B:
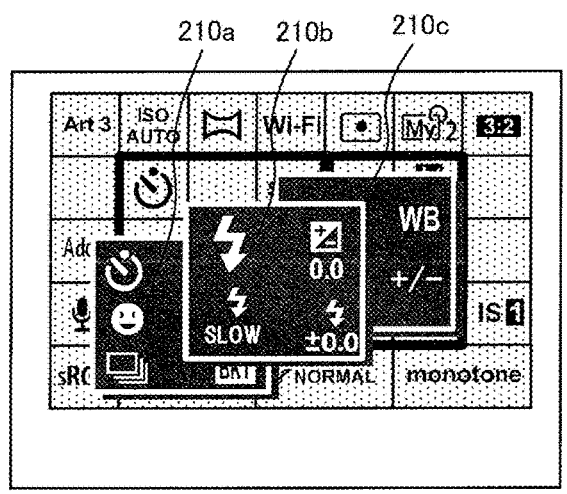
FIG. 12B illustrates a screen 2 having the other display appearance 1 of the related-item plate.
Figure 12C:
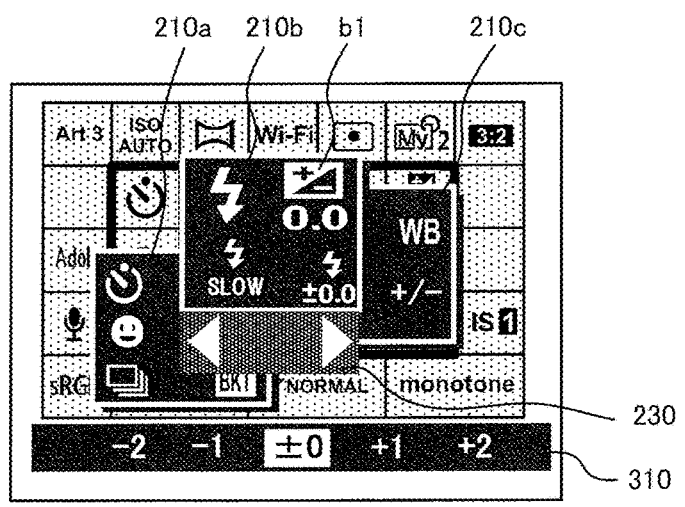
FIG. 12C illustrates a screen 3 having the other display appearance 1 of the related-item plate.

FIGS. 12A to 12C respectively illustrate screens 1 to 3 having an other display appearance 1 of a related-item plate. The other display appearance 1 is an example in which a plurality of related-item plates are displayed at the same time. In the other display appearance 1, the related-item plate 210a, the related-item plate 210b, and the related-item plate 210c are displayed in a group on the list screen 100 (see FIG. 12A). When the related-item plate 210b is designated (touch-manipulated), the related-item plate 210b is displayed on the other related-item plates (see FIG. 12B).

When the setting item b1 of the related-item plate 210b is designated on the screen of FIG. 12B, the screen is changed to the screen of FIG. 12C. On the screen of FIG. 12C, the setting item b1 is displayed in a larger size in the related-item plate 210b, the manipulation guide 230 is displayed under the related-item plate 210b, and an option row 310 that corresponds to the setting item b1 is displayed at the bottom of the screen.

Figure 13A:
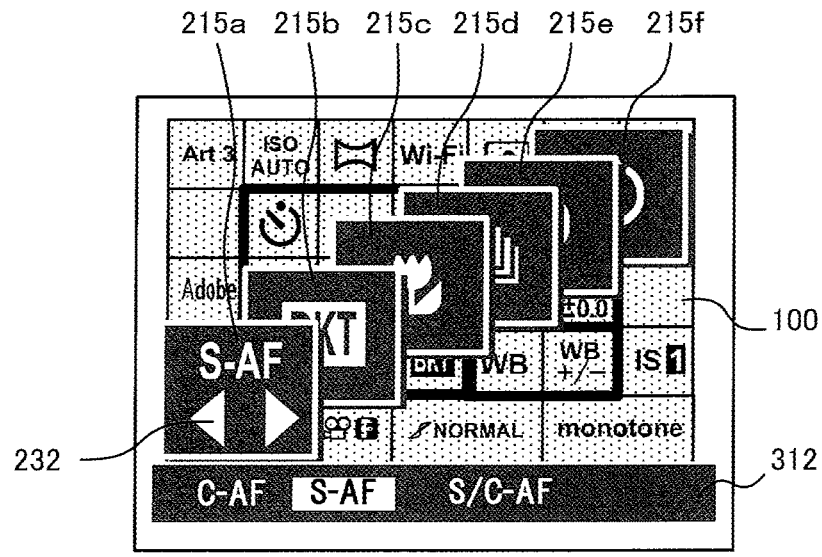
FIG. 13A illustrates a screen 1 having an other display appearance 2 of a related-item plate.
Figure 13B:
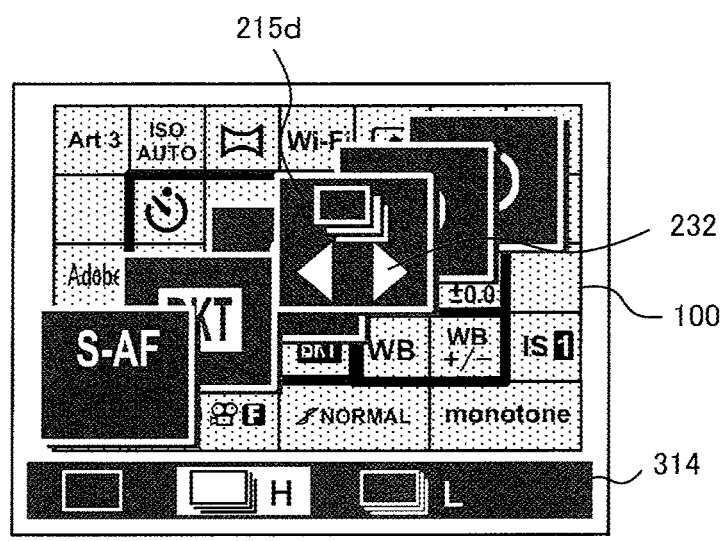
FIG. 13B illustrates a screen 2 having the other display appearance 2 of the related-item plate.

FIGS. 13A and 13B respectively illustrate screens 1 and 2 having an other display appearance 2 of a related-item plate. The other display appearance 2 is an example in which a related-item plate is displayed in a state of a bunch of single-item plates. The related-item plate 210 is displayed in a state of a bunch of single-item plates 215. In this example, as illustrated in FIG. 13A, the setting item a1 to the setting item a6 that belong to the drive-related related-item block are displayed in a state of the bunch of single-item plates 215 that is indicated by a single-item plate 215a to a single-item plate 215f.

The setting item of the single-item plate 215a on the top is a setting item that can currently be changed. In the single-item plate 215a that is a plate for a changeable setting item, the buttons 232 of a manipulation guide are displayed.

Further, correspondingly, an option row 312 constituted of the options for the single-item plate 215a is displayed.

When the single-item plate 215d that corresponds to the setting item a4 is selected on the screen of FIG. 13A, the single-item plate 215d illustrated in FIG. 13B is displayed on the top of the overlapping plates. In the single-item plate 215d, the buttons 232 of a manipulation guide are displayed. Further, correspondingly, the display is switched to an option row 314 constituted of the options for the single-item plate 215d.

Figure 14:
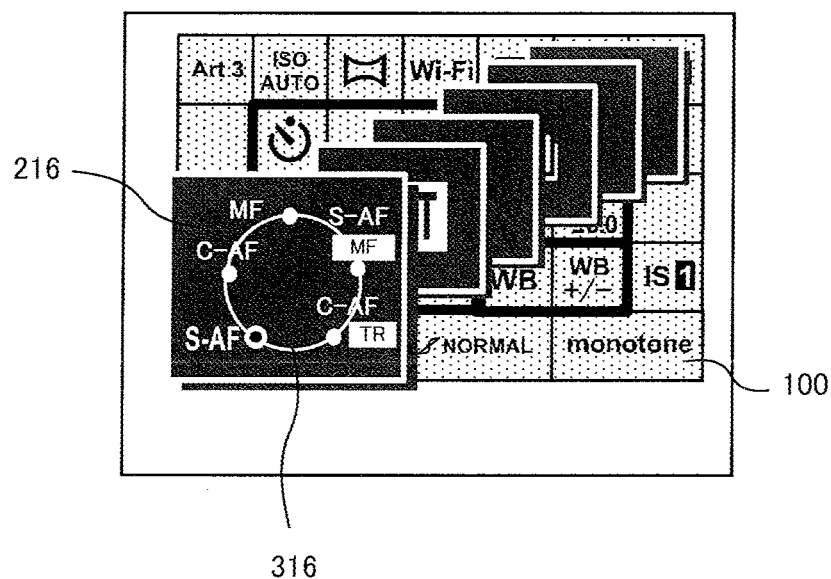
FIG. 14 illustrates a screen having a modification of the single-item plate.

Next, FIG. 14 illustrates a modification of the single-item plates 215. A single-item plate 216 of FIG. 14 has an appearance in which options are included in a single-item plate. The single-item plate 216 is related to the setting item a1, and an option row 316 in which five options are circumferentially arranged is displayed in the single-item plate 216. An option that has been touch-manipulated in the single-item plate 216 is set as a condition for the setting item a1.

In the above-described condition setting screen according to the first embodiment, an item plate is displayed on a list screen and manipulation for changing a condition for a setting item is performed by use of the item plate, so the manipulation performance is greatly improved, compared to when performing changing manipulation by selecting a setting item on a list screen. The reason is that it is not easy to perform manipulation for changing a setting item on a list screen because each setting item is displayed in a small size on the list screen. Further, it is easy to return from the item plate to the list screen because the item plate is displayed overlapping the list screen.

Further, this results in reducing the need for manipulation for switching between item plates when making a series of condition settings because an item plate is displayed as a related-item plate in which setting items whose respective functions are related to one another are grouped.

Second Embodiment

A second embodiment provides processing of displaying a setting screen when setting items displayed on a list screen are not arranged according to the related function. In other words, the second embodiment provides processing of displaying a setting screen when an item plate is not a related-item plate. A hardware configuration of the digital camera 1 in which a display control apparatus according to the second embodiment is mounted is identical to that of the first embodiment.

Figure 15A:
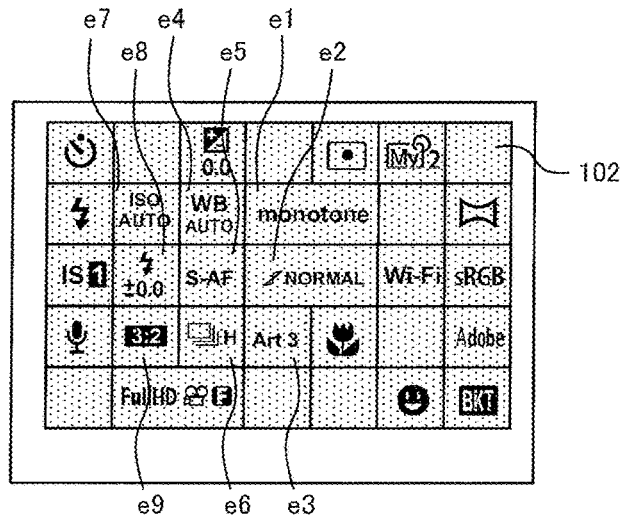
FIG. 15A illustrates a list screen according to a second embodiment.

FIG. 15A illustrates an example of a list screen 102 according to the second embodiment. In the second embodiment, when any of the setting items are designated on the list screen, the display control unit 36 displays, in the item plate, along with the designated setting item, setting items arranged near the designated item on the list screen. The list screen 102 is displayed overlapping the live view image LV, but an illustration of the live view image LV will be omitted. The arrangement of the setting items on the list screen 102 displayed on the screen 50 is not an arrangement that is made according to the related function, and is different from that on the list screen 100 of FIG. 4A.

Some of the setting items will be described. Setting items e1, e2, e3, e4, e5, e6, e7, e8, and e9 are monotone, image quality, special shooting, white balance, AF, continuous shooting, ISO speed, correction of a flash light emission amount, and an aspect ratio, respectively.

Figure 15B:
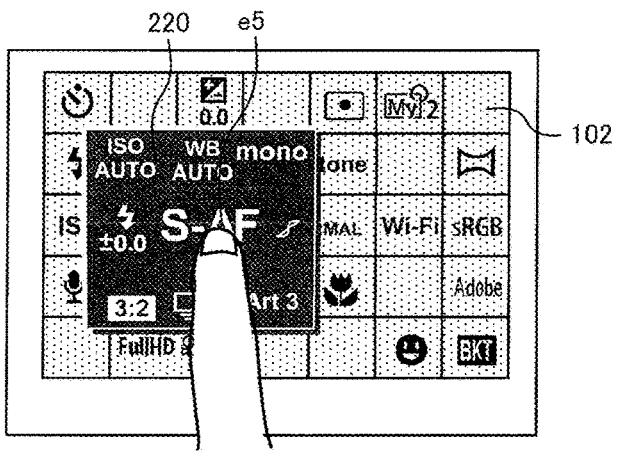
FIG. 15B illustrates the screen with an adjacent-item plate according to the second embodiment.

It is assumed that the setting item e5 (AF) is designated by a touch manipulation on the list screen 102 of FIG. 15A. Then, as illustrated in FIG. 15B, an adjacent-item plate 220 is displayed overlapping the list screen 102 in a position centered on the setting item e5 on the list screen 102. Setting items adjacent to a designated setting item are grouped in the item plate according to the second embodiment, so this will be referred to as "adjacent-item plate 220". In this example, nine setting items in total that are arranged in a state in which the setting item e5 is in the center and the others are respectively located on its left, right, top, bottom, or diagonally, are grouped in the adjacent-item plate 220. Further, the display in the adjacent-item plate 220 is simplified compared to the list screen 102. The setting item e1 and the setting item e2 are examples of it. If the display is simplified in the adjacent-item plate 220 without the display becoming confusing and if the display size is made larger instead, it is possible to improve the visibility.

Figure 15C:
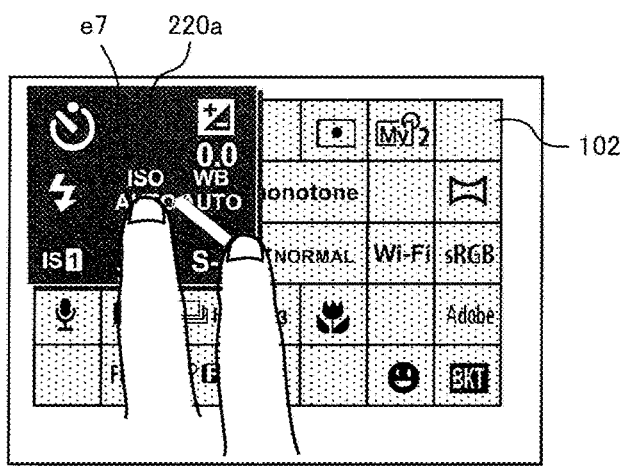
FIG. 15C illustrates the screen when moving the adjacent-item plate according to the second embodiment.

The setting items in the adjacent-item plate 220 can be switched by moving a finger in a state in which the adjacent-item plate 220 is being touch-manipulated. FIG. 15C illustrates the screen when moving the finger diagonally up and to the left (around the setting item e7 on the list screen 102) in FIG. 15B. In the adjacent-item plate 220, the center is changed to the setting item e7, and at the same time, the setting items displayed in the adjacent-item plate 220 are changed to the setting items adjacent to the setting item e7 on the list screen 102.

Figure 16A:
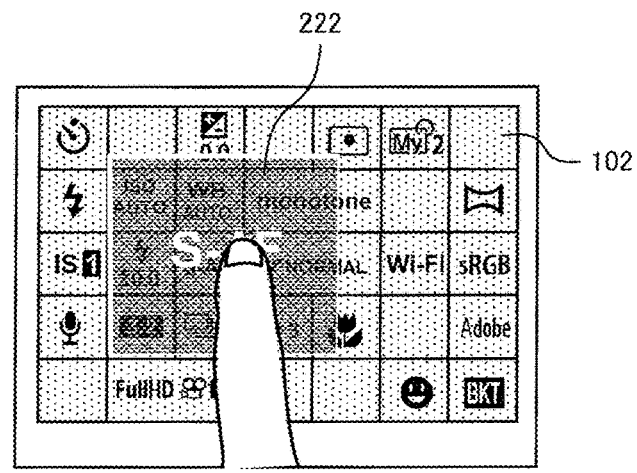
FIG. 16A illustrates a screen 1 having an other display appearance 1 of an adjacent-item plate.
Figure 16B:
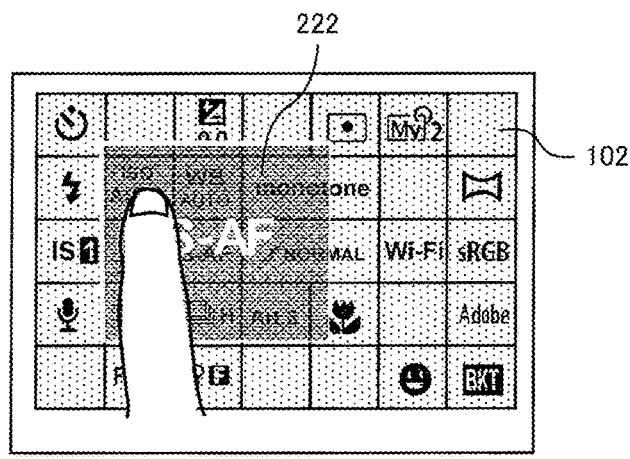
FIG. 16B illustrates a screen 2 having the other display appearance 1 of the adjacent-item plate.
Figure 16C:
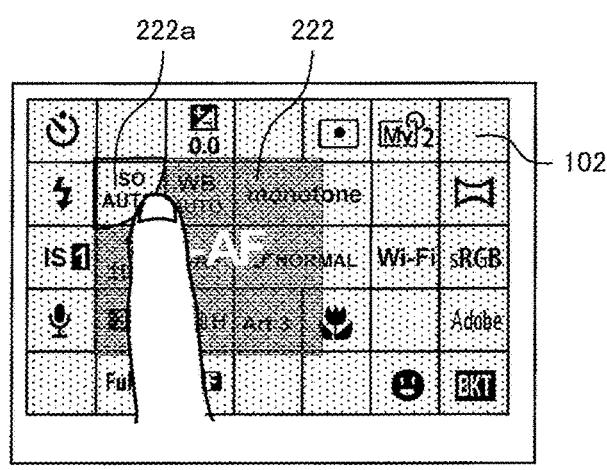
FIG. 16C illustrates a screen 3 having the other display appearance 1 of the adjacent-item plate.

Next, an other display appearance 1 of an adjacent-item plate will be described. With respect to the adjacent-item plate having the other display appearance 1, there is an improvement in the visibility of the underlying list screen 102. FIGS. 16A to 16C illustrate an example of a halftoned adjacent-item plate 222. If the halftoned adjacent-item plate 222 is displayed, the underlying list screen 102 shows through, so the content of the list screen 102 can easily be confirmed without moving the adjacent-item plate 222.

Further, when sliding the touching finger to a circumferential position of the adjacent-item plate 222 (FIG. 16B), a portion 222a that is a portion of the position to which the adjacent-item plate 222 has been slid becomes transparent, and the hidden setting items of the underlying list screen 102 show through (FIG. 16C). This permits an easy confirmation on a setting item name of the list screen 102 that is hidden under the adjacent-item plate 222, without moving the adjacent-item plate 222.

Figure 17A:
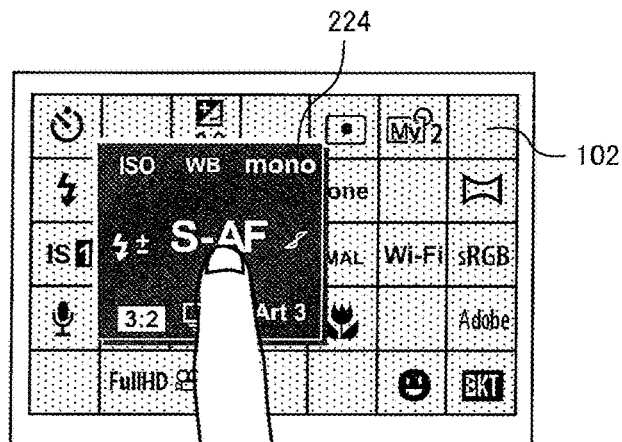
FIG. 17A illustrates a screen 1 having an other display appearance 2 of an adjacent-item plate.
Figure 17B:
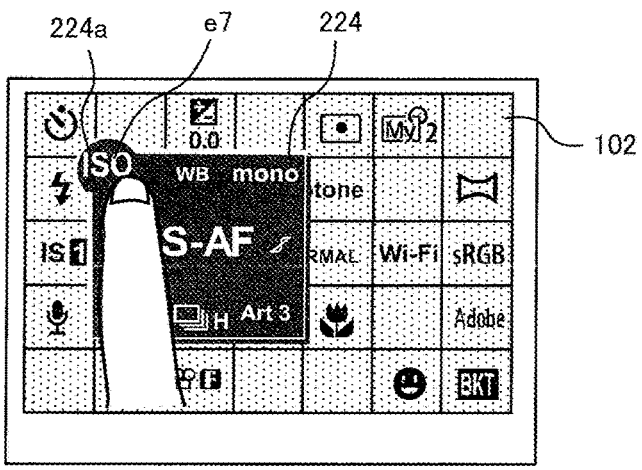
FIG. 17B illustrates a screen 2 having the other display appearance 2 of the adjacent-item plate.
Figure 17C:
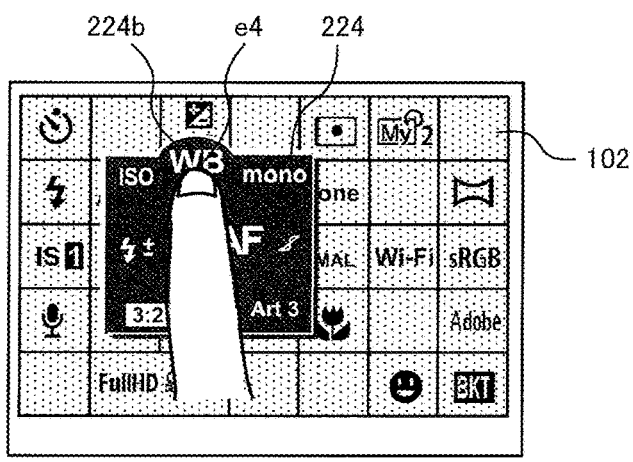
FIG. 17C illustrates a screen 3 having the other display appearance 2 of the adjacent-item plate.

Next, an other display appearance 2 of an adjacent-item plate will be described. The other display appearance 2 is an example of enlarging a name of a setting item in an adjacent-item plate. It is assumed that a slide manipulation is performed for sliding, diagonally up and to the left to around the setting item e7, a finger that touches the setting item e5 located in the center of an adjacent-item plate 224 in FIG. 17A. A portion of the adjacent-item plate 224 around the setting item e7 is expanded outward, and the setting item e7 is displayed in a larger size in an expanded portion 224a (FIG. 17B). Further, when the finger slides to move to the setting item e4, a portion around the setting item e4 is expanded outward, and the setting item e4 is displayed in a larger size in an expanded portion 224b (FIG. 17C).

Accordingly, a setting item name can be made larger by use of an easy manipulation even when it is not possible to display the setting item name in a larger size in the adjacent-item plate 224, which results in easily finding a desired setting item.

It has been described that, according to the above-described first and second embodiments, the control unit 30 is realized by software processing performed by the CPU 30a that has read a control program, but some or all of it may be realized by hardware processing. The display control apparatus according to the present invention may very well be applied to an information device other than a digital camera, for example to a printer.

In conventional display control apparatuses, a display area often serves as a touch area as well. Thus, in a conventional display control apparatus, an icon for touching needs to have a size not less than a prescribed size so as to improve the touch manipulation performance when several pieces of information are displayed. Thus, there has been a problem in which the conventional display control apparatuses have low visibility because the number of pieces of information that can be displayed at a time is limited. Further, there has been another problem in which, if setting conditions are hierarchically configured in a conventional display control apparatus, it is difficult to know, for example, what kind of setting conditions there are at an upper hierarchy level when transiting to a lower hierarchy level. According to the above-described first and second embodiments, it is possible to realize a condition setting screen in which a selection manipulation is easily performed for selecting an item or its condition when making a condition setting, without losing a "view at a glance", and to solve the above-mentioned problems of a conventional display control apparatus.

In addition, the present invention is not limited to the above-described embodiments as they are, but may be embodied by deforming constituents within a scope not deviating from the gist of the invention at an execution step. In addition, various inventions can be made by appropriately combining a plurality of constituents that have been disclosed in the above embodiments. For example, all the constituents that have been disclosed in the embodiments may be appropriately combined. Further, constituents in different embodiments may be appropriately combined. It should be understood that various modifications and applications can be made without departing from the scope and the spirit of the invention.

EXPLANATIONS OF LETTERS OR NUMERALS 1 digital camera
10 imaging unit 12 image processor
14 manipulation unit
16 touch panel
18 display unit
20 RAM
22 memory
30 control unit
32 shooting condition setting unit
34 touch manipulation determination unit
36 display control unit
100, 101, 102 list screen
200 item plate
210 related-item plate
212, 215, 216 single-item plate
220, 222, 224 adjacent-item plate
230 manipulation guide
300 option row
320 option
330 cursor

What is claimed is:

1. A display control apparatus comprising:
a processor that executes a process comprising:
displaying, on a display unit of a camera, a list screen including a plurality of setting items for setting a shooting condition for the camera, wherein the plurality of setting items include at least one group obtained by grouping setting items;
receiving a photographer input designating one of the plurality of setting items displayed on the list screen;
responsive to receiving the photographer input designating one of the plurality of setting items, displaying an item plate overlapping the designated one of the plurality of setting items and a plurality of setting items adjacent to the designated one of the plurality of setting items, the item plate including at least the designated one of the plurality of setting items, wherein the designated one of the plurality of setting items is displayed larger on the item plate than on the list screen, and wherein the item plate is displayed in a translucent manner such that setting items of the list screen below the item plate can be seen through the item plate;
receiving a touch input sliding to a circumferential position of the item plate; and
responsive to receiving the touch input sliding to a circumferential position of the item plate, making a portion of a position on the item plate to which the received touch input has been slid transparent so that only an overlapped setting item on the list screen adjacent to the position on the item plate to which the received input has been slid becomes clearly visible by removing the translucent plate at the position on the item plate, wherein the item plate does not move relative to the list screen during the received touch input sliding to the circumferential position of the item plate.

2. The display control apparatus according to claim 1, wherein the item plate is an adjacent item plate that has only (1) the designated setting item and (2) a plurality of setting items adjacent to the designated setting item and that were included in the list screen as setting items.

3. The display control apparatus according to claim 2, wherein the processor displays an option row that indicates a condition corresponding to a setting item displayed in the grouped item plate.

4. The display control apparatus according to claim 3, wherein
the processor displays, along with the grouped item plate, a manipulation guide for selecting a condition displayed in the option row.

5. The display control apparatus according to claim 1, wherein
the processor displays, on the list screen, an area bounded as a grouped item, the area being constituted of setting items adjacent to the designated setting item and that were included in the list screen.

6. The display control apparatus according to claim 1, wherein the item plate is an adjacent item plate, and wherein the processor enlarges a setting item displayed in the adjacent item plate according to an instruction.

7. A display control method comprising:
displaying, on a display unit of a camera, a list screen including a plurality of setting items for setting a shooting condition of the camera, wherein the plurality of setting items include at least one group obtained by grouping setting items;
receiving a photographer input designating one of the plurality of setting items displayed on the list screen;
responsive to receiving the photographer input designating one of the plurality of setting items, displaying an item plate overlapping the designated one of the plurality of setting items and a plurality of setting items adjacent to the designated one of the plurality of setting items, the item plate including at least the designated one of the plurality of setting items, wherein the designated one of the plurality of setting items is displayed larger on the item plate than on the list screen, and wherein the item plate is displayed in a translucent manner such that setting items of the list screen below the item plate can be seen through the item plate;
receiving a touch input sliding to a circumferential position of the item plate; and
responsive to receiving the touch input sliding to a circumferential position of the item plate, making a portion of a position on the item plate to which the received touch input has been slid transparent so that only an overlapped setting item on the list screen adjacent to the position on the item plate to which the received input has been slid becomes clearly visible by removing the translucent plate at the position on the item plate, wherein the item plate does not move relative to the list screen during the received touch input sliding to the circumferential position of the item plate.

8. A computer-readable non-transitory storage medium having stored therein a program for causing a computer to execute display control processing, the processing comprising:
displaying, on a display unit of a camera, a list screen including a plurality of setting items for setting a shooting condition of the camera, wherein the plurality of setting items include at least one group obtained by grouping setting items;
receiving a photographer input designating one of the plurality of setting items displayed on the list screen;
responsive to receiving the photographer input designating one of the plurality of setting items, displaying an item plate overlapping the designated one of the plurality of setting items and a plurality of setting items adjacent to the designated one of the plurality of setting items, the item plate including at least the designated one of the plurality of setting items, wherein the designated one of the plurality of setting items is displayed larger on the item plate than on the list screen, and wherein the item plate is displayed in a translucent manner such that setting items of the list screen below the item plate can be seen through the item plate;

receiving a touch input sliding to a circumferential position of the item plate; and responsive to receiving the touch input sliding to a circumferential position of the item plate, making a portion of a position on the item plate to which the received touch input has been slid transparent so that only an overlapped setting item on the list screen adjacent to the position on the item plate to which the received input has been slid becomes clearly visible by removing the translucent plate at the position on the item plate, wherein the item plate does not move relative to the list screen during the received touch input sliding to the circumferential position of the item plate.

9. The display control apparatus according to claim 1, wherein the item plate includes setting items adjacent to the designated setting item, and wherein the list screen displays, simultaneously, a frame enclosing one or more setting items adjacent to the designated setting item.

10. The display control apparatus according to claim 2, wherein the process executed by the processor further comprises:

displaying, overlapping the list screen, a bunch of a plurality of item plates obtained by converting, into adjacent item plates, respective setting items of the at least one group when one of the setting items of the at least one group is designated on the list screen, wherein a first one of the adjacent item plates is displayed overlapping a second one of the adjacent item plates;

detecting a setting item within the list screen that has been designated by a photographer;

producing an adjacent item plate on a plate larger in size than a frame enclosing the setting item designated from among the setting items within the list screen and a plurality of setting items that are adjacent to the designated setting item and that were included in the list screen as setting items, the adjacent item plate having only (1) the designated setting item and (2) a plurality of setting items that are adjacent to the designated setting item and that were included in the list screen as setting items, wherein when any of the setting items are designated on the list screen, the processor displays, in the adjacent item plate, along with the designated setting item, setting items adjacent to the designated setting item on the list screen; and switching, responsive to a user input towards one of the plurality of setting items that are adjacent to the designated setting item and that are included on the item plate displayed, to a second adjacent item plate, the second group item plate including the one of the plurality of setting items as a second designated item and a second plurality of setting items that are adjacent to the second designated setting item; and displaying the second adjacent item plate, wherein the second adjacent item plate includes the second designated item and setting items adjacent to the second designated item on the list screen.

11. The display control apparatus according to claim 10, wherein the user input towards one of the plurality of setting items defines a direction, and wherein the second adjacent item plate is located away from the adjacent item plate in the direction.

12. The display control apparatus according to claim 1, further comprising removing the display of the item plate.

13. The display control apparatus according to claim 1, wherein the list screen is displayed overlapping a live view image display.

14. The display control apparatus according to claim 11, wherein the user input towards one of the plurality of setting items is a touch manipulation that defines a direction.

15. The display control apparatus according to claim 3, wherein the processor displays the option row away from the grouped item plate.

16. The display control apparatus according to claim 2, wherein a display of setting items in the grouped item plate is simplified compared to the corresponding setting items in the list screen.

17. The display control apparatus according to claim 16, wherein the display of setting items in the grouped item plate has fewer peripheral edges than a set of the corresponding setting items in the list screen.

\* \* \* \* \*